United States Patent [19]

Latty

[11] 4,298,562
[45] Nov. 3, 1981

[54] METHOD FOR MANUFACTURING SEALING RINGS

[76] Inventor: Cyril X. Latty, 6, Avenue du Maréchal de Lattre de Tassigny, 92210 Saint-Cloud, France

[21] Appl. No.: 49,032

[22] Filed: Jun. 15, 1979

Related U.S. Application Data

[63] Continuation of Ser. No. 860,226, Dec. 13, 1977, abandoned, and a continuation of Ser. No. 654,770, Feb. 3, 1976, abandoned.

[30] Foreign Application Priority Data

Feb. 4, 1975 [FR] France ............................... 75 03465
Feb. 4, 1975 [FR] France ............................... 75 03468

[51] Int. Cl.$^3$ ................... B29G 5/00; D03D 15/00; D03C 1/02; F16J 9/20
[52] U.S. Cl. ................................. 264/103; 264/137; 264/257; 264/258; 264/DIG. 67; 277/1; 277/140; 277/204; 277/205; 277/227; 277/233; 277/DIG. 6
[58] Field of Search ............... 264/137, 103, 257, 258, 264/DIG. 67; 277/230, 205, 203, 204, 227, 229, 233, 1, DIG. 6, 140

[56] References Cited

U.S. PATENT DOCUMENTS

| 793,463 | 6/1905 | McDonald | 277/227 X |
|---|---|---|---|
| 1,050,184 | 1/1913 | Walker | 277/227 |
| 1,372,529 | 3/1921 | Mastin | 277/205 X |
| 1,623,894 | 4/1927 | Taylor | 264/258 X |
| 1,712,003 | 5/1929 | Hubbard | 277/227 |
| 1,942,705 | 1/1934 | Hubbard et al. | 277/205 X |
| 1,968,650 | 7/1934 | Mastin | 277/205 X |
| 1,978,240 | 10/1934 | Wheeler | 277/205 X |
| 2,052,603 | 9/1936 | Christenson | 277/205 |
| 2,134,324 | 10/1938 | Brackett | 277/227 X |
| 2,151,096 | 3/1939 | Freedlander | 277/227 X |
| 2,290,640 | 7/1942 | Hubbard | 264/257 X |
| 2,400,533 | 5/1946 | Buffington | 264/137 |
| 2,533,742 | 12/1950 | Poltorak | 277/227 X |
| 2,665,151 | 1/1954 | Fisler et al. | 277/205 X |
| 2,676,823 | 4/1954 | Olson et al. | 277/227 X |
| 3,120,960 | 2/1964 | Pippert et al. | 277/230 |
| 3,219,503 | 11/1965 | Blair | 277/205 X |
| 3,271,039 | 9/1966 | Kohl et al. | 277/230 X |
| 3,341,211 | 9/1967 | Houghton et al. | 277/230 X |
| 3,873,106 | 3/1975 | Pastelak | 277/227 X |
| 3,901,517 | 8/1975 | Heathcott | 277/205 |

FOREIGN PATENT DOCUMENTS 1026327  4/1966  United Kingdom ............... 277/204

Primary Examiner—Philip Anderson
Attorney, Agent, or Firm—Holman & Stern

[57] ABSTRACT

The method comprises taking textile or synthetic threads and impregnating the threads by passage in a bath of an elastomer or plastomer material. Thereafter a band is formed from the impregnated threads and shaped into a ring and moulded under pressure.

10 Claims, 7 Drawing Figures

FIG_1
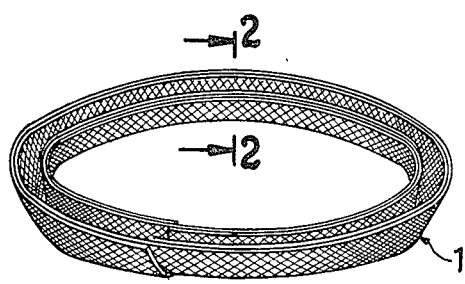
FIG_2
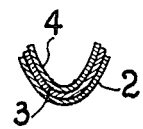
FIG_3
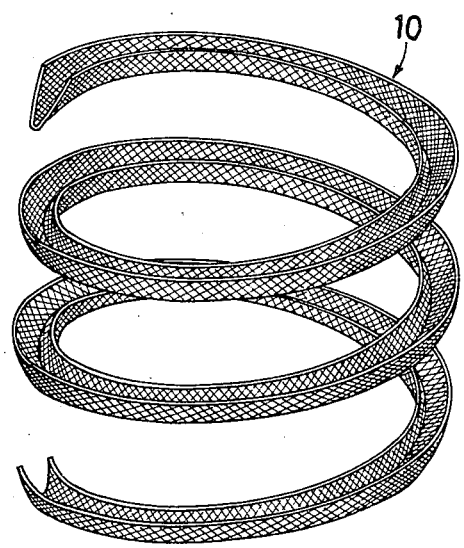
FIG_4
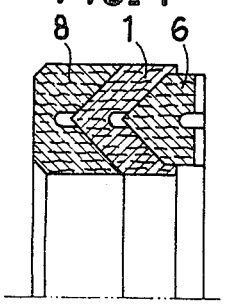
FIG_5
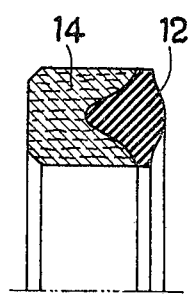

METHOD FOR MANUFACTURING SEALING RINGS

This is a continuation of application Ser. No. 860,226, filed Dec. 13, 1977, now abandoned, and a continuation of U.S. Ser. No. 654,770, filed Feb. 3, 1976, now abandoned.

BRIEF SUMMARY OF THE INVENTION

Many types of sealing rings are known at the present time which are more or less satisfactory. Among the most appreciated, in particular in hydraulic and pneumatic applications, are the rings formed by bands cut on the bias from a fabric which has been previously coated, these rings being thereafter for example moulded in such manner as to have a V or herring-bone shape. These rings are quite effective, but their manufacture is complicated and poses many problems. It is indeed necessary to coat the fabric in an extremely homogeneous manner to ensure that the ring has sufficient cohesion to have good mechanical properties and a long life.

These manufacturing methods require the use of large equipment for impregnating, coating and cutting the fabrics. Moreover, the bands produced are often liable to fray in the region of the cutting.

An object of the present invention is to overcome these drawbacks.

According to the invention there is provided a method for manufacturing a sealing ring comprising starting with natural and/or synthetic threads, coating the threads with an elastomer or plastomer material, or with a resin, forming a band from the coated threads, and shaping the band in the form of a ring and moulding the ring under pressure.

As the threads are impregnated separately, they are coated with an elastomer or plastomer material in an even manner throughout their surface. Thus this material is distributed in an homogeneous manner throughout the bands formed by these threads. This band can be braided or woven, depending on the subsequent utilization.

In many cases, it may be advantageously impregnated before or during its shaping with a material similar to that which had impregnated the threads, and preferably with the same material. It is obvious that the impregnation of this band and the impregnation of the threads is much simpler than that of a fabric of relatively large size, and that consequently the equipment and devices required are much smaller and much cheaper.

The band may moreover be manufactured exactly to the dimension corresponding to the sealing ring to be manufactured and have the desired width. The method is thus highly flexible.

The threads may be easily chosen in accordance with the qualities that the sealing ring must possess. For example, they may be constituted by natural or synthetic textile threads or even by a mixture of these two types of threads. These threads are, for example, threads of cotton, asbestos, graphite, polyamide, PTFE, metal or the like. Each one thereof is advantageously subjected to a treatment rendering it adherent for example with isocyanates, then impregnated with a solution of an elastomer or plastomer material, or a resin, for example, natural rubber, acrylic nitrile (Perbunan, Hycar, etc.), polychloroprene, polybutadiene, fluorinated elastomer or PTFE in the form of fibres or resin. The impregnated threads are thereafter braided, for example on a braiding machine having suspended bobbins, in the flat state, to produce a band-blank having predetermined width, thickness and texture.

In a modification of the invention, the threads are woven on a narrow-band weaving machine to produce the band-blank.

Preferably, this band is itself impregnated with the same material as the threads by passage through a bath of a solution of this material or, if desired, a bath of this material.

The elastomer or plastomer material preferably constitutes 30% of ths finished product. Its percentage in the impregnating solution is so chosen that the finished product has a predetermined swelling in fluids, which may be zero or, on the contrary, sufficient to ensure a maintenance of stresses necessary to ensure the seal when the ring is in use. Charges serving as a lubricating agent and/or protecting agent may also be added to the impregnating solution. These charges are, for example, graphite, mica, zinc oxide, a dispersion of PTFE or other material.

A plurality of thicknesses of the band are preferably put in contact with each other and assembled. Each of these thicknesses may be constituted by a length of an independent band, the various lengths being disposed alongside each other and then assembled. These thicknesses may also be part of the same band which is, for example, folded in a zig-zag manner and wound on itself. The assembled thicknesses are then moulded so as to constitute the ring.

The method according to the invention thus produces rings of very different types. Several examples of rings will be described hereinafter with reference to the accompanying drawings.

For example, in a first embodiment of the invention, several lengths of bands having zero swelling are superimposed flat against each other by coiling into a helix, or by folding in a zig-zag manner, a band of great length, or even simply by placing a number of identical bands on top of each other. The assembly of these superimposed bands is hot moulded under pressure to produce the desired shape of the sealing ring. Most often, before moulding, or preferably before their superimposition, the bands are so shaped as to impart thereto a V-shape or any other like shape, which permits the utilization of the sealing ring alone or in combination with other complementary rings.

According to another embodiment of the invention, several thicknesses of bands having a relatively high swelling in fluids are coiled in the form of a spiral so as to constitute a cylinder and then assembled in the form of a ring of rectangular section. Rings of this type are particularly adapted to the sealing of a piston and a cylinder of a hydraulic or pneumatic jack. The piston may have annular peripheral grooves machined without precise tolerances, since the elasticity of the ring and its swelling accommodate the machining and assembling tolerances.

BRIEF DESCRIPTION OF THE SEVERAL VIEWS OF THE DRAWING

FIG. 1 is a view of a shaped ring before moulding;

FIG. 2 is a sectional view taken on line 2—2 of FIG. 1;

FIG. 3 is an exploded view showing the coiling of the band constituting the ring shown in FIG. 1 into a helix;

FIG. 4 is an axial sectional view of a sealing ring having a plurality of rings manufactured in accordance with the method of the invention;

FIG. 5 is an axial sectional view of another sealing ring produced by means of a ring according to the invention.

FIG. 1A illustrates the steps of the method according to the invention for producing the ring shown in FIG. 1 The method comprises starting with natural and/or synthetic threads, coating these threads in an impregnating bath of an elastomer material, braiding or weaving the coated threads into a flat band to the desired width of the finished ring so that there is no need to trim the band to the desired width, imparting a substantially V-section to the band, coiling the V-section band into superimposed coils as shown in FIG. 3, placing these coils in axially adjoining relation to each other so as to form a ring as shown in FIGS. 1 and 2 and moulding this ring under pressure and heat. If desired, the flat band may be immersed in an impregnating bath of an elastomer material before it is shaped into a V-section.

Detailed examples of the method according to the invention will now be given.

DETAILED DESCRIPTION

EXAMPLE 1

Rings were manufactured with cotton threads (24/3) which had been treated with isocyanates to render them adherent, with an impregnation rate of 0.5-2%, then subjected to a rubberizing treatment by passage in a bath of nitrile rubber dissolved in a solvent of the polar type, the percentage of nitrile rubber in this solution being such that the swelling of the material when extracted from the mould is nil.

Figure 1A:
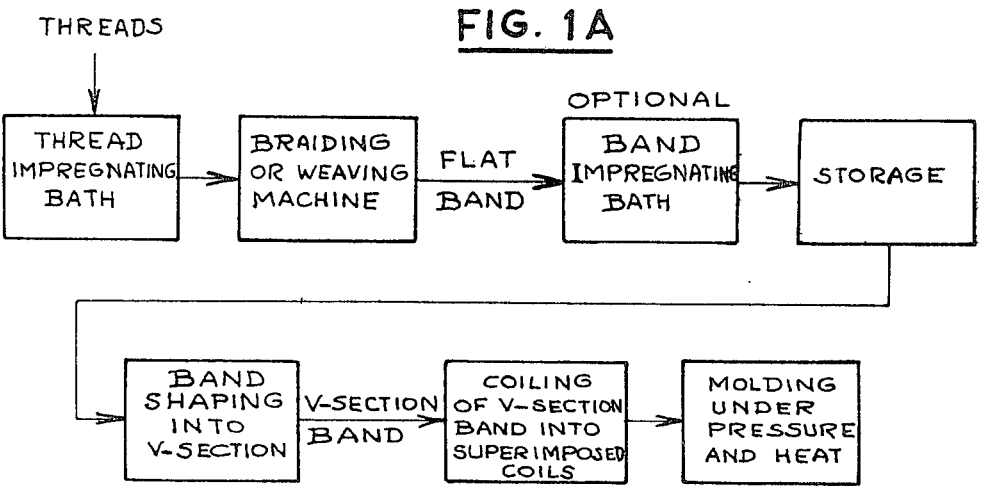
FIG. 1A illustrates the steps of the method according to the invention for producing the ring shown in FIG. 1 and finally moulding the latter under pressure and heat.

The threads thus impregnated with 8-10% of rubber were braided so as to constitute a band having a width of 17 mm and a thickness of b 1.5 mm, comprising 62 threads and 30 crossings per 10 cm, with this band having, for example, a length of 330 mm (FIGS. 1 and 2).

This band 1 was coiled into a helix so that the thicknesses 2, 3 and 4 are superimposed in height, or, more precisely, axially of the helix, and the coils always have the same dimension. These coils 2, 3, 4 were assembled with each other and shaped so as to have a V-shaped section and hot-pressure moulded for 5 minutes, with the pressure being of the order of 400 kg/cm² and the temperature 150° C. The ring thus formed has nominal size of 45×60 mm and weighs 5 g.

Several rings 1 constructed in this way were freely fitted to each other (FIG. 4) to constitute a set of sealing rings capable of withstanding pressures of as much as 1000 bars. This set comprises one or a plurality of rings 1 (one in the case illustrated in FIG. 4) and a head ring 6 and a base ring 8 formed in an identical manner from blanks of 400 and 500 mm respectively.

EXAMPLE 2

Rings of a form similar to those of Example 1 were produced from polyamide threads which have been subjected to a treatment with isocyanates to render them adherent and then rubberized by passage in a bath of a solution of acrylic nitrile copolymers. These threads were thereafter braided into a band having a width of 13 mm and a thickness of 1.1 mm, with 22 crossings and 50 threads per 10 cm. The band 10 obtained was thereafter impregnated with the same solution as the threads and shaped so as to have a V-shaped section. This V-section band 10 was coiled into a helix (FIG. 3) and the coils of the helix fitted into each other so that the V-sections 2, 3 and 4 were exactly superimposed and in contact with each other as shown in FIG. 1. The superimposed thicknesses were then assembled and moulded under pressure for 5 minutes, the pressure being 400 kg/cm² and the temperature being about 160° C. The content of acrylic nitrile of the copolymer in the solution was such that the swelling of the finished material is 0%.

In this way rings were manufactured constituting a sealing ring having a nominal size of 50×65 mm.

EXAMPLE 3

Similar rings were manufactured with asbestos threads impregnated in a dispersion of PTFE. These threads were then braided into a band having a width of 24 mm and a thickness of 1.8 mm and having 22 crossings per 10 cm.

A plurality of similar bands were then shaped and superimposed and moulded under pressure for 15 minutes at 150° C. the pressure being 300 kg/cm². The assembly was then roasted for one hour at 300° C.

The proportion of PTFE in the finished product was 20% and the asbestos represented 80% of this product.

EXAMPLE 4

A special anti-friction ring was produced with asbestos threads and threads of an anti-friction metal such as antimonial lead; namely 47 threads of asbestos (16/2) and 14 threads of asbestos reinforced with anti-friction metal (10/10) were impregnated by passage in a bath of nitrile rubber solution, then braided into a band which was itself impregnated with nitrile rubber in such an amount that it has 65% of asbestos, 15% of anti-friction metal and 20% of nitrile rubber. This band was then placed flat and folded in a to-and-fro zig-zag manner so as to superimpose a plurality of identical lengths of band, the folds being so assembled as to impart to the assembly a substantially rectangular section. The assembly was then moulded at a temperature of 150° C. at a pressure of 400 kg/cm² for 15 minutes.

The ring obtained had a nominal dimension of 89×100 and a height of 40 mm. Its swelling was 0%.

EXAMPLE 5

There was also manufactured, by the method of the invention, a composite ring shown in FIG. 5 comprising a textile thread which had been treated and impregnated and a rubber section member 12. For example, cotton threads which had been subjected to a treatment with isocyanates to render them adherent, then rubberized by passage through a nitrile rubber solution, were braided to constitute a band having a width of 10.5 mm, a thickness of 1.3 mm, and a length of 565 mm. This band-blank was formed in a mould in a press at a pressure of 250 kg/cm² at a temperature of 150° C. for 1 minute. Then this blank 14 was assembled with a section member 12 of nitrile rubber having a Shore hardness of 80. The assembly of the band 12 and the section member 14 is vulcanized in a mould in a press at a pressure of 200 kg/cm² and a temperature of 150° C. for 5 minutes. The ring thus obtained comprises 45% of textile threads and 55% of rubber.

EXAMPLE 6

A ring which swells in fluids was produced from cotton threads of quality D having a linear mass of 120 tex. The threads were first impregnated by passage in a bath of acrylic nitrile copolymers dissolved in a solvent of the polar type and of a molecular weight of 72, with the percentage of arcrylic nitrile in this solution being such that the finished product has in hydraulic fluids a swelling of 5% in oil of reference ASTM 3 within 24 hours at 70° C. Thereafter, the impregnated and dried threads were braided on a braiding machine having suspended bobbins, so as to have substantially 4 stitches per centimeter and to form a blank having a height of 12.5 mm and a thickness of 1.5 mm.

The braiding was then impregnated in the same solution as the threads also by a continuous passage in a bath. Thereafter, after drying, it was coiled into a cylinder of a plurality of thicknesses, for example 4 thicknesses, and the four superimposed layers were assembled and moulded by heating for 15 minutes at 160° C. at a pressure of 600 bars so as to be united into a single block. The cylinder is thereafter cut at the desired height to constitute annular sealing rings whose rectangular section has a height of 8 mm.

Figure 6:
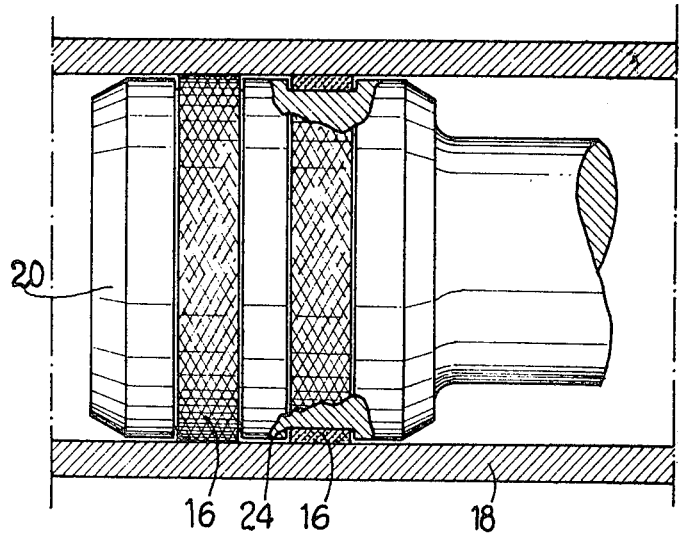
FIG. 6 is an axial sectional view of a hydraulic jack employing a ring according to a modification of the invention.

The rings obtained were found to be particularly suitable for the sealing of hydraulic or pneumatic jacks. Two rings 16 (FIG. 6) are, for example, mounted on the piston 20 of a single-acting hydraulic jack, this piston being driven by a mineral oil at a pressure of 350 bars with sudden variations in the direction of translation, with the temperature varying from ambient temperature to 70° C. Each ring is inserted in a rectangular-sectioned peripheral groove having a height of 9 mm and a depth 2.35 mm formed in this piston 20.

There is a large clearance between the ring and the end of the groove upon assembly. However, it is found that a few seconds after starting up, the sealing is complete. The clearance between the ring and the groove is compensated for by the swelling of the ring.

A jack constructed in this way was employed for 2,800 hours without any leakage occurring. No wear of the ring or cylinder was observed.

The same total sealing was achieved in jacks whose piston is driven by water of the mains supply at a pressure of 25 bars, or even pneumatic jacks.

In all cases, the swelling of the ring in the fluids compensates for clearances. It is therefore possible to manufacture the piston very cheaply by machining the grooves in a simple manner without precise tolerances.

Other types of rings may be produced in the same manner by the method of the invention. The nature of the threads and the nature and proportions of the impregnating materials are chosen in accordance with the use to which the desired ring is put. The impregnation of the threads or of the bands braided or woven from these threads is easily achieved with no need for considerable or space-consuming, and therefore costly, equipment.

Moreover, this impregnation is extremely homogeneous and results in sealing rings having optimal mechanical properties and a long life.

It will be understood that the bands may be manufactured continuously and be of great length subsequently cut to the desired size.

By means of this method, the sealing rings may be more simply manufactured at lower cost while they possess very high flexibility of adaptation to the various uses to which they are put.

Having now described my invention, what I claim as new and desire to secure by Letters Patent is:

1. In a method for manufacturing a substantially wholly flexible substantially V-sectioned sealing ring of a reinforcing first material coated and impregnated with a vulcanized flexible elastomeric second material and defining circumferentially extending flexible lip portions of said two materials, the sealing ring having a uniform homogeneous structure throughout its cross section, said method comprising weaving or braiding a plurality of threads into a band, coiling the band about an axis to form a blank comprising a plurality of coils of the band which are in superimposed relation to each other axially of the blank, and moulding the blank in a mould under pressure with application of heat to impart said substantially V-sectioned shape, said band being put into a substantially V-sectioned shape subsequent to the weaving or braiding thereof but prior to the moulding thereof; the improvement comprising, prior to said weaving or braiding, individually passing said threads through a bath of said elastomeric material so as to individually coat and impregnate said threads whereby said woven or braided band is automatically uniformly and homogeneously impregnated and wholly coated, including on lateral edges thereof, with said elastomeric second material, and weaving or braiding the band to such width that said coated lateral edges of the band define said lip portions of said sealing ring and said sealing ring is wholly constituted by the coils of the coated and impregnated band and has a uniform homogeneous structure throughout its section.

2. A method as claimed in claim 1, wherein said bath of said second material is a bath of nitrile rubber in a solvent and said pressure and said temperature are about 400 kg/cm$^2$ and about 150° C.

3. A method as claimed in claim 1, wherein said bath of said second material is a bath of acrylic nitrile copolymers in a solvent and said pressure and said temperature are about 400 kg/cm$^2$ and about 160° C.

4. A method as claimed in claim 1; wherein said method for forming the band further comprises impregnating said band with an elastomeric material compatible with the second material which had impregnated the threads.

5. A method as claimed in claim 1, wherein the threads are of synthetic material.

6. A method as claimed in claim 1, wherein the threads are of metallic material.

7. A method as claimed in claim 1, wherein the second material is in a solution in a percentage which is such that the resulting ring swells in fluids.

8. A method as claimed in claim 1, wherein the second material is in a solution in a percentage which is such that the resulting ring does not swell in fluids.

9. A method as claimed in claim 1, wherein the threads are of textile material.

10. A method as claimed in claim 1, wherein the impregnating material constitutes 10 to 40% of the finished sealing ring.

* * * * *